J. W. BISHOP.
CUTTING MACHINE.
APPLICATION FILED AUG. 18, 1919.
1,378,935.
Patented May 24, 1921.
2 SHEETS—SHEET 1.
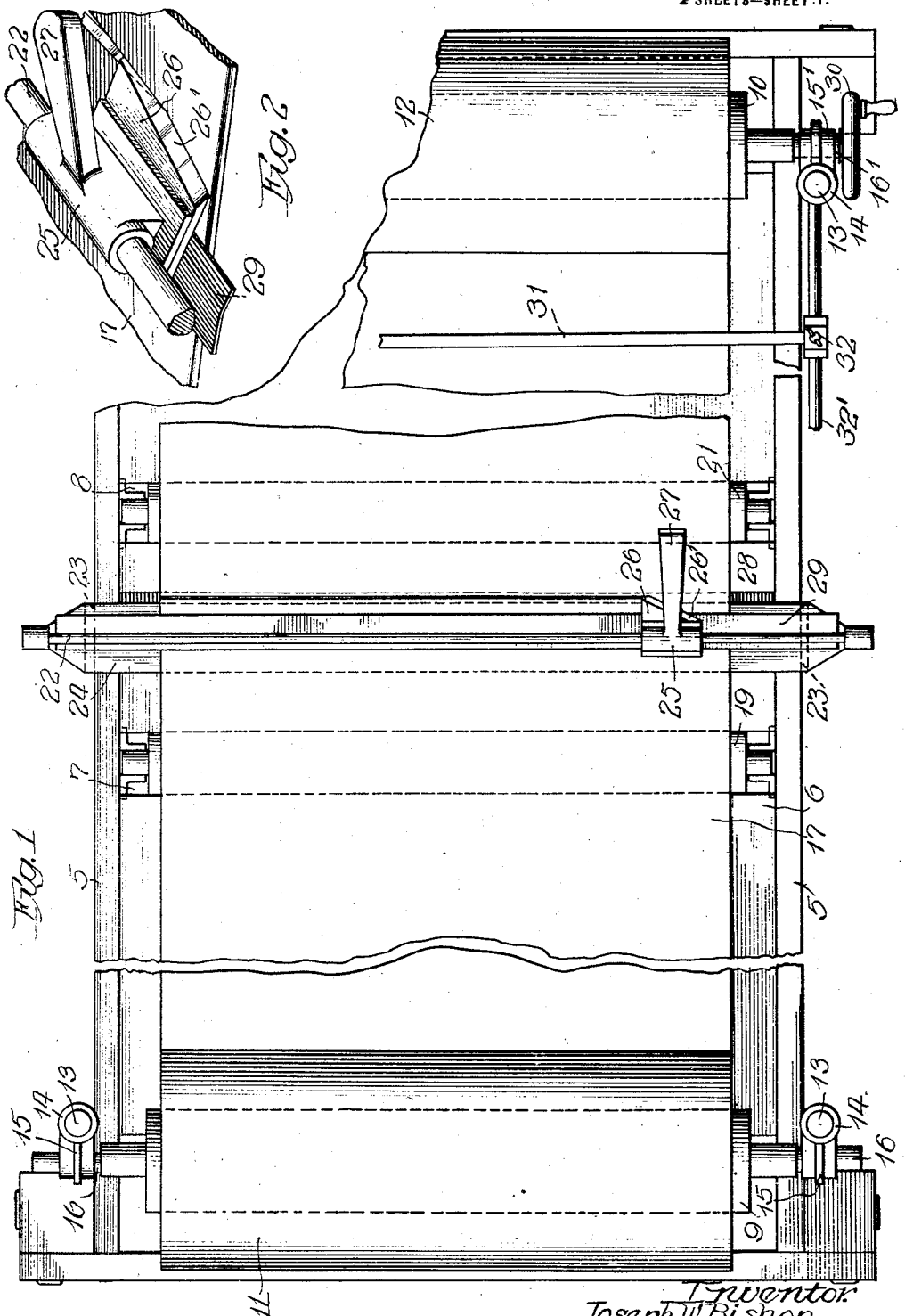

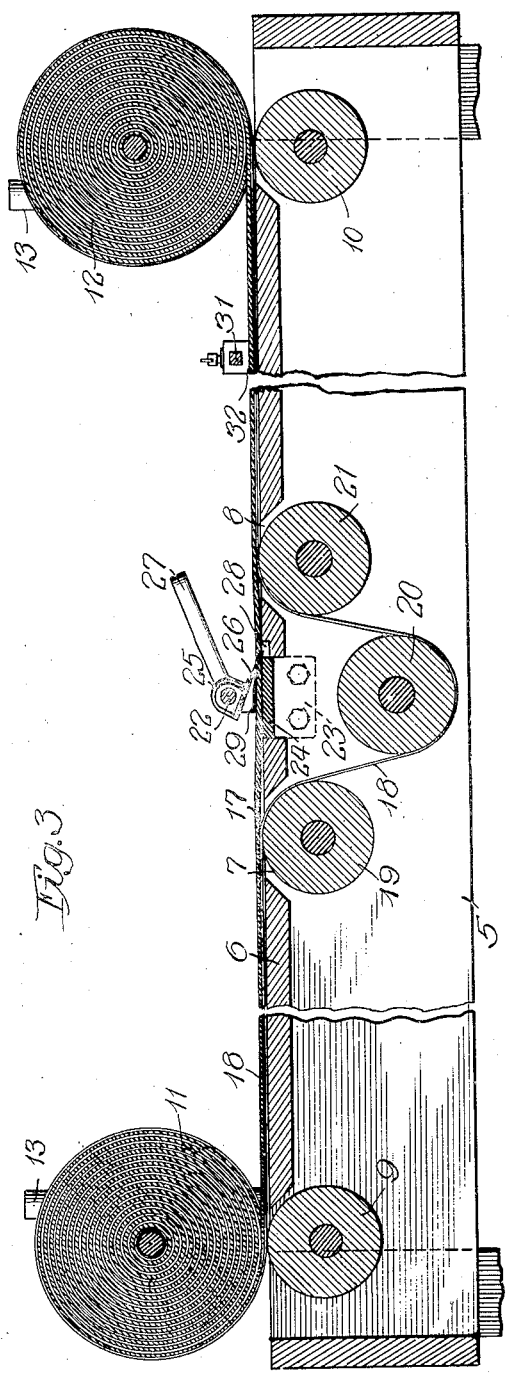
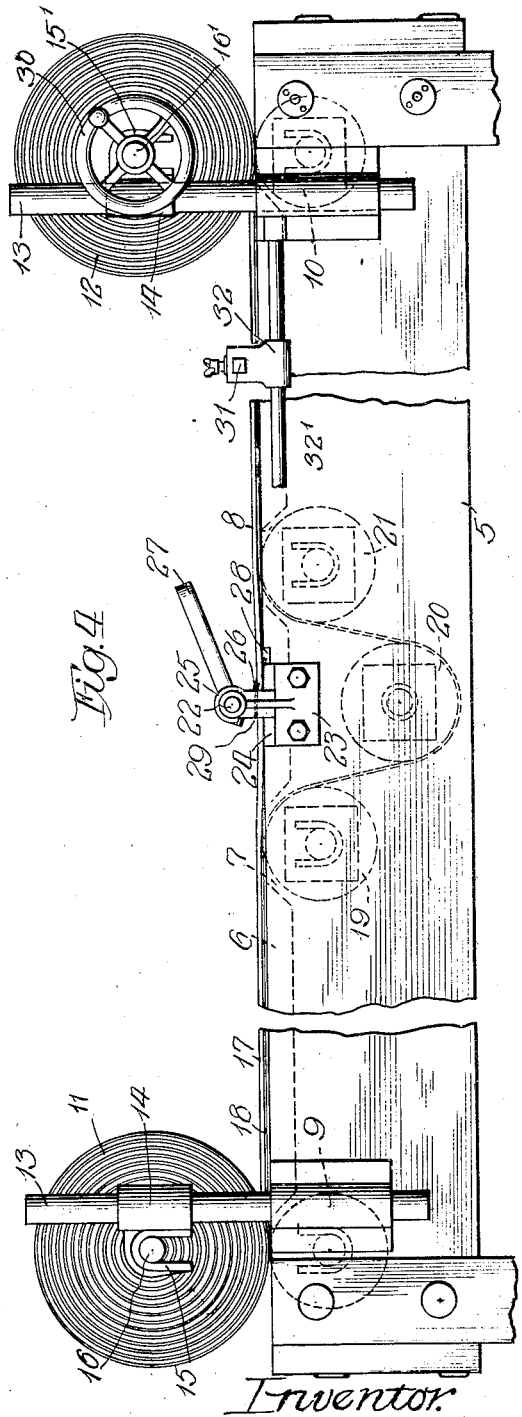

UNITED STATES PATENT OFFICE.

JOSEPH W. BISHOP, OF MUSKEGON, MICHIGAN, ASSIGNOR TO THE BRUNSWICK-BALKE-COLLENDER COMPANY, OF CHICAGO, ILLINOIS, A CORPORATION OF DELAWARE.

CUTTING-MACHINE.

1,378,935.      Specification of Letters Patent.      Patented May 24, 1921.

Application filed August 18, 1919. Serial No. 318,190.

*To all whom it may concern:*

Be it known that I, JOSEPH W. BISHOP, a citizen of the United States, residing at Muskegon, in the county of Muskegon and State of Michigan, have invented certain new and useful Improvements in Cutting-Machines, of which the following is a specification.

The object of this invention is to provide a machine of simple construction whereby strips of unvulcanized rubber interwound with muslin may be temporarily freed from the muslin, cut in sections of predetermined length, and rewound with the muslin in a continuous operation.

Another object is to cut the rubber stock with a bevel so that the cut edges of each severed section may be overlapped and form a bevel joint.

And a further object is to provide means for holding the rubber stock fixedly during the cutting operation.

In the accompanying drawings illustrating a preferred embodiment of the invention—

Figure 1 is a plan view of the machine partly broken away.

Fig. 2 is a detail perspective sectional view showing the cutter.

Fig. 3 is a longitudinal sectional view.

Fig. 4 is a side elevation.

Referring to the drawings, 5 is the frame which may be of any suitable form or construction preferably having a bed or table 6 with openings 7 and 8 therein.

Rollers 9, 10, are mounted in the frame at each end of the table to support the supply roll 11 and the take-up roll 12 which rest thereon. Standards 13 are arranged on the sides of the frame adjacent the ends of the rollers 9, 10, and sleeves 14 are slidably mounted thereon and provided with inverted bearings 15, 15' for the spindles 16, 16' of the rolls 11, 12. The rubber stock in a continuous strip 17, or in a plurality of strips arranged end to end, is interwound with a continuous strip of muslin 18 in the roll 11 which is held in position on the roller 9 by the sliding bearings 15.

Idle rollers 19, 20, 21, are mounted in the sides of the frame, the rollers 19 and 21 being located in the openings 7 and 8 in the table and the roller 20 being located between rollers 19 and 21 and lower in the frame.

A rod 22 is supported above the table in brackets 23 fastened to the sides of the frame. A plate 24 is seated in the table beneath the rod. The brackets may be integral with the plate or the plate may be separate therefrom and suitably fastened to the frame. A sleeve 25 is slidably mounted on the rod and it carries a knife 26 and a handle 27. The knife has a cutting edge 26' which is angularly disposed to the rod and its lowest end is adapted to project into and operate in a groove 28 in the table in front of the plate 24. A thin metal plate 29 is arranged upon the rubber stock below the rod to form a bearing strip for the knife in its travel across the stock.

The machine may be operated by power applied to spindle 16' or it may be operated by a crank wheel 30 on said spindle.

A gage 31 is supported in brackets 32 adjustably mounted on bars 32' at the sides of the bed to indicate the proper length of the section of stock to be cut by the knife.

In practice the roll of rubber stock interwound with muslin is mounted in place on the roller 9. The rubber stock is passed between the plates 24 and 29 and the muslin is separated from the rubber stock at the roller 19 and passed down through opening 7 over the roller 19, around roller 20, and over roller 21 up through opening 8 to join the rubber stock again. One end of the muslin strip is attached to spindle 16' and when said spindle is rotated the rubber stock and muslin will be drawn from the supply roll through the machine. The gage is set to indicate how far the stock must be drawn to cut the sections of uniform length. When the stock has been properly positioned the knife is drawn across the table and the stock is severed in the proper length with a smooth clean bevel cut. Then the spindle is again rotated and the severed section is carried by the muslin to the take-up roll. At the completion of the work the stock sections will be rolled up interwound with the muslin in the take-up roll. Thus the muslin is utilized as a carrier for moving the stock through the machine and by separating the muslin from the stock temporarily at cutting position, I am able to cut the stock without injuring the muslin. In traveling across the table the knife bears upon the plate 29 to hold the stock rigid and against plate 24 as a guide.

My machine is useful in cutting unvulcanized rubber stock in proper lengths for making the wrappers of battery jars but it is obvious that the machine may be employed for cutting other stock interwound with muslin or other materials. For some purposes a muslin or other carrier not interwound with the stock may be fed into the machine at the stock end thereof to carry the stock through and to be interwound with the cut sections, and an ordinary knife not slidably mounted on the machine may be used if found suitable for the purpose.

I am aware that changes in the form and proportion of parts and in the details of construction may be made without departing from the spirit or sacrificing any of the advantages of the invention and I therefore reserve the right to make all such changes as fairly fall within the scope of the following claims.

I claim:

1. The combination of a frame, means for supporting a roll of stock thereon, a continuous carrier, means for moving the carrier through the machine to carry the stock from the roll through and beyond a cutting position, and means for separating the carrier from the stock at cutting position.

2. The combination of a frame, means for supporting a roll of stock thereon, a continuous carrier, a knife slidably supported on the frame and adapted to be moved transversely across the machine to cut the stock, means for moving the carrier through the machine to carry the stock from the roll through and beyond cutting position, and means for separating the carrier from the stock at cutting position.

3. The combination of a frame, a table thereon having openings therein on both sides of cutting position, means for supporting a roll of stock at one end of the table, a carrier interwound with the stock, means for supporting a take-up roll of cut stock interwound with the carrier at the other end of the table, means for moving the carrier through the machine, and means for guiding the carrier down through one opening and up through the other opening to separate the carrier from the stock at cutting position.

4. The combination of a frame, a table thereon having openings therein on both sides of cutting position, a roller operating in each opening, another roller intermediate of said openings and below the table, means for supporting a roll of stock at one end of the table, means for supporting a take-up roll at the other end of the table, and a continuous carrier for moving the stock over the table from the stock roll to the take-up roll, said carrier passing down through one of said openings and over said rollers and up through the other opening to separate the carrier from the stock at cutting position.

5. The combination of a frame, a table thereon having openings therein on both sides of cutting position, means for supporting a roll of stock at one end of the table, a carrier interwound with the stock, means for supporting a take-up roll of cut stock interwound with the carrier at the other end of the table, means for moving the carrier through the machine, means for guiding the carrier down through one opening and up through the other opening to separate the carrier from the stock at cutting position, a transverse rod supported above the table at cutting position, and a knife slidably supported on the rod to cut the stock.

6. The combination of a frame, means for supporting a roll of stock thereon, a continuous carrier, means for moving the carrier through the machine to carry the stock from the roll through and beyond cutting position, means for separating the carrier from the stock at cutting position, a plate seated in the table at cutting position, and a knife supported above the table and mounted to slide across the table against said plate as a guide.

7. The combination of a frame, means for supporting a roll of stock thereon, a continuous carrier, means for moving the carrier through the machine to carry the stock from the roll through and beyond cutting position, means for separating the carrier from the stock at cutting position, a plate arranged above the stock at cutting position to bear upon and hold the stock rigid during the cutting operation, and a knife supported above the table and mounted to slide across the table bearing upon said plate to cut the stock.

JOSEPH W. BISHOP.

Witnesses:
G. O. WARDROP,
A. BRILL.